United States Patent [19]

Stinson et al.

[11] Patent Number: 4,518,146

[45] Date of Patent: May 21, 1985

[54] VALVE OPERATOR CONTROL SYSTEM

[75] Inventors: Walter J. Stinson; Larry J. Phillips, both of Houston, Tex.

[73] Assignee: General Signal Corporation, Stamford, Conn.

[21] Appl. No.: 489,683

[22] Filed: Apr. 28, 1983

[51] Int. Cl.³ ............................................. F16K 31/128
[52] U.S. Cl. ................................... 251/28; 91/388; 74/424.8 VA
[58] Field of Search ............... 91/388; 74/424.8 VA; 251/57, 58, 79, 25, 28, 29

[56] References Cited

U.S. PATENT DOCUMENTS

| | | | |
|---|---|---|---|
| 2,933,937 | 4/1960 | Kron et al. | 74/424.8 VA |
| 4,043,533 | 8/1977 | Cowley | 251/57 |
| 4,063,707 | 12/1977 | Zouzoulas | 74/424.8 VA |
| 4,215,844 | 8/1980 | Bowen | 251/28 |
| 4,335,867 | 6/1982 | Bihlmaier | 91/388 |

*Primary Examiner*—George L. Walton
*Attorney, Agent, or Firm*—Martin LuKacher

[57] ABSTRACT

A control system for a valve actuator which is subject to oppositely directed displacement due to thermal expansion and spring forces has sensor switches which detect successively greater amounts of compression of a spring which compresses to accommodate thermal expansion of the valve, its stem and seat when the valve is seated in closed position. A position servomechanism which is responsive to the position of the stem and a control signal operates a motor for advancing and retracting the stem. Separate control devices, which are two way valves when the motor is a fluid motor and the servomechanism is a fluid operative servomechanism, are controlled by the sensor switches to stop the motor from overcompressing the spring when first position of the spring is reached and to operate the motor to retract the valve back to the first position when the second position is reached whereby to maintain a predetermined bias forcing the valve against the seat due to the spring forces in spite of thermal expansion of the valve, its seat and stem.

6 Claims, 5 Drawing Figures

(NORMAL OPERATING SEQUENCE)

(FIRST SYSTEM SEQUENCE)

(SECOND SYSTEM SEQUENCE)

VALVE OPERATOR CONTROL SYSTEM

DESCRIPTION

The present invention relates to valve operator control systems, and particularly to a control system for a valve actuator which is subject to oppositely directed displacement due to thermal expansion and spring forces.

The invention is especially suitable for use in the valve actuator or operator of plug valves which are subject to thermal expansion and contraction and utilize compression springs, known as spring packs or canisters in their operators, to accommodate the thermal expansion and contraction of the valve, including its stem and seat. Such plug valves find applications in oil refineries in controlling the flow of catalyst into a reaction chamber which is subject to temperature extremes, for example, in the range of 1500° F., as well as in other industrial applications wherein the valves are subject to oppositely directed displacements due to thermal expansion and spring forces.

Plug valve operators usually contain air motors which drive the valve stem longitudinally, to bring the valve member into and out of seated relationship with the valve seat to shut off flow through the valve, and also to control flow therethrough. When the valve is closed, for example during process startup, the environment increases in temperature so that the valve seat, the valve member and the valve stem, all or portions of which are within the thermal environment, expand. The stem is motivated by a linear drive operated by a motor, typically an air motor. The drive couples the stem to a compression spring which contracts to take up the thermal expansion of the valve. The position of the stem is controlled by a position servomechanism which compares the stem position with a selected position as determined by a control signal. The stem position is not an indication of the amount of compression of the spring. To exacerbate matters, the compression of the spring provides a false indication of the closed position of the valve. Operating upon an indication that the valve is not fully closed, the servomechanism is fooled and the motor continues to drive. Since the valve is seated, the drive causes further and overcompression of the spring. This gives rise to a failure mode in that, when the spring fully compresses, only a breakdown can result. In a worse case situation the stem can bend or break and the fully compressed spring with hundreds of pounds of force is released. This may result in considerable damage to the valve, if not to the reaction chamber itself.

In order to overcome this problem, reliance has been placed on an over torque condition of the motor which results in release or popping of valves in the motor assembly. Such valves have not been reliable in that they are operated by the supply air pressure which operates the motor, which pressure can vary. Other attempts to respond to the failure mode have involved limit switches which stop the motor from operating upon stem travel of more than a predetermined amount. Even where the motor is stopped, manual operation, namely hand cranking, has been required in order to retract or back off the valve so as to maintain the proper compression condition. It is desirable to maintain such a compression which provides a bias or load of the valve against the valve seat to insure positive seating. There are also appliances which provide a warning or alarm for an overcompression condition of the spring. These so called flag and whistle devices merely warn the personnel assigned to the process to stop the actuation of the valve. Then these personnel must handcrank the valve to retract it to the proper position so as to overcome the overcompression, failure mode.

It is the object of this invention to provide an improved valve operator for a valve used in a high temperature environment in which thermal expansion subjects the valve operator to failure.

It is another object of the invention to provide an improved control system for a plug valve operator which has compression springs for accommodating thermal growth of valve parts and prevents failures due to overcompression of such springs.

It is a still further object of the present invention to provide an improved control system for valve actuators of valves such as plug valves which are spring loaded when seated and are used in a high temperature environment and are subject to thermal expansion; the system automatically maintaining spring loading within a predetermined range and preventing valve failures due to overload conditions.

It is a still further object of the present invention to provide an improved control system for plug valve operators using position servomechanisms to actuate and displace the valve stem in which the stem is also coupled to a spring pack adapted to compress when the valve is closed and is subject to thermal expansion wherein failure modes due to overcompression are overcome without requiring complete redesign of the servomechanism, spring pack and other parts of the valve operator.

Briefly described, the invention provides a control system for a valve having a valve actuator. An absolute position responsive servomechanism operates the valve actuator for motivating the moveable member of the valve toward and away from the seat of the valve, which is subject to thermal expansion. A compression spring is coupled to the valve member and biases the valve member against the seat upon engagement of the valve member with the seat. The control mechanism has means for detecting the displacement in compression of the spring to a plurality of positions; a first of which positions corresponds to a predetermined spring load of the valve member against the seat, and a second of which positions corresponds to an overcompression of the spring. Means are provided which are operative independently of the position responsive servomechanism for inhibiting the motivation of the valve by the servomechanism when a displacement of the spring to the first position is detected and for operating the servomechanism to displace the valve away from the second position towards the first position when a displacement of the spring to the second position is detected. The system maintains the compression of the spring and the bias or loading of the valve member against the seat in a preset range, after the servomechanism brings the valve to its closed position. The system operates in spite of thermal displacement of the seat and expansion of the valve member and its stem, and prevents failure modes by providing positive shut off of the actuator as well as control of the actuator to maintain the requisite load or bias of the valve member against the seat.

The foregoing and other objects, advantages and features of the inventions as well as a presently preferred embodiment thereof will become more apparent from a reading of the following description in connection with the accompanying drawings in which.

Figure 1:
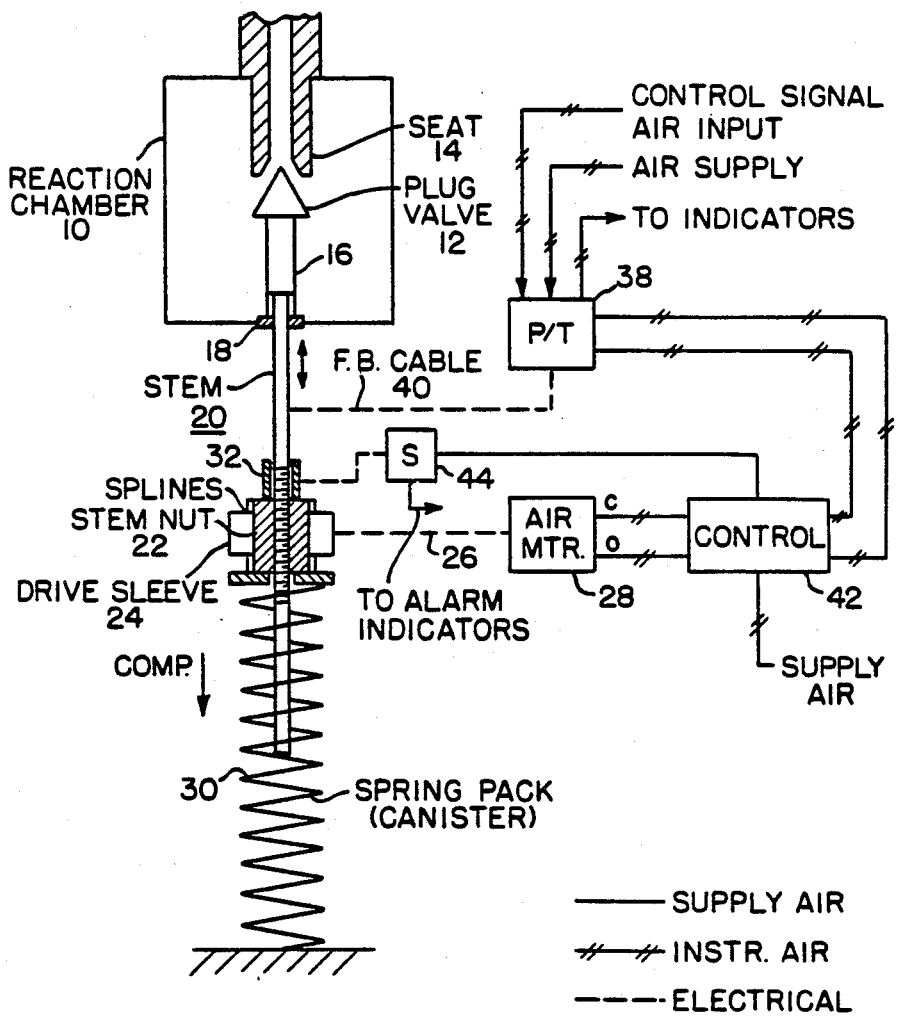
FIG. 1 is a diagram schematically illustrating a plug valve having a valve operator with a control system in accordance with an embodiment of the invention.

Referring first to FIG. 1, there is shown, schematically, a reaction chamber 10 having a plug valve 12 with its seat 14. The moveable plug valve member has a stem arrangement 16 which extends through packing 18 into the chamber 10. The plug valve is actuated by a valve operator 20 which, for example, may be a conventional plug valve operator, suitably the LIMITORQUE model S3B which is available from the Limitorque Division of Philadelphia Gear Corp. of Lynchburg, Va. The stem 16 extends into this operator where it is driven by a stem nut 22 having a drive sleeve 24 splined thereto. The drive sleeve is suitably driven by a worm and worm gear, represented diagramatically by the dash line 26, from an air motor 28. Compression springs shown schematically as a spring 30 are part of a spring pack and are in a canister rotatable with the drive sleeve. It will be seen that when the valve, including its seat 14, plug valve member 12 and stem 16 expand the compression spring 30 is compressed. This spring 30 is a thermal compensation spring designed and used to accommodate the expansion of the valve arrangement, while maintaining a bias on the valve, holding it against the seat, when the plug 12 is disposed in sealed relationship on the seat 14.

An indicator sleeve 32 extends from the stem nut 22. Conventionally, this sleeve is used to operate a compensating spring indicator which indicates the compression of the spring 30. This indicator is called the flag and whistle and is shown at 34 in FIG. 2. Overcompression of the spring causes the flag to rise and the whistle to sound. The operator then must de-clutch the motor 28 and drive the worm manually, as with a crank wheel shown at 36 in FIG. 2, to retract the plug 12 from the seat. If the plug is not retracted and the motor continues to drive, the spring 30 will become fully compressed. This is a dangerous failure mode since it can give rise to bending or cracking of the stem 16.

The stem 16 is positioned by the air motor 28 in response to a pneumatic control signal to a positioner transmitter 38, indicated as P/T in FIG. 1. A conventional differential detector valve in the positioner transmitter 38 obtains a position input from a feedback cable 40 attached to the stem 16. The differential detector valve is connected to a four way control valve in a controller 42 which controls the transmission of supply air through the motor 28 from its closed (C) to its open (O) ports thereby driving the gearing 26, the drive sleeve 24 and the stem nut 22 to move the stem 16 longitudinally toward and away from the seat 14. A transmitter valve in the positioner transmitter 38 is mechanically coupled to the positioner valve and transmits a pneumatic signal output to indicators which may be in the control room where personnel responsible for the process perform a monitoring and control function. Of course, the control can be automatic in accordance with process parameters.

The positioner transmitter 38, the controller 42 and the air motor 28 provide an absolute position responsive servomechanism. This mechanism does not automatically respond to the compression of the spring 30. The response of the servomechanism can be erroneous when the plug 12 is on the seat 14 and thermal expansion occurs. The growth of the stem results in a signal on the feedback cable 40 indicative of the stem being away from closed position. The control signal air input commands the servomechanism to close the valve. Since the valve is already closed, the spring 30 must compress. Overcompression can result in a solid spring. Forces then transfer to the stem which results in the failure mode effects noted above. The air motor may be equipped with torque responsive valves which cause the motor to stop if such valves operate. However, the operation of such valves may depend upon the pressure of the air in the motor. The flow conditions during overload or high torque may reduce the air pressure so that it is insufficient to operate the valves. Then the motor continues to turn and the failure mode effects ensue. Limit valves may operate when a certain number of rotations of the stem nut occurs which also must operate safety valves with which the motor is equipped. Such valves may also be subject to low pressure conditions. In any event once the motor stops, it may be necessary to handcrank the gears 26 so as to retract the stem. Such handcranking requires a great deal of effort (muscle power). Even if the controller can be operated, special attention of the personnel responsible for the process is required in order that the proper loading or bias to maintain the plug against the seat and hold the valve sealed is needed. The failure mode conditions thus can result in the starving of air to the air motor and at a minimum requires special effort and attention from the personnel responsible for the process. It is a feature of this invention to provide a positive shut off system which prevents the motor 28 from overcompressing the spring 30 and giving rise to failure mode conditions. The invention also provides for automatic retraction of the stem to an extent where a predetermined spring bias remains on the plug and against the seat to hold the valve sealed without the need for intervention by the personnel responsible for the process or any effort on their part.

These features are obtained through the use of sensors 44 which are indicated by the letter S in FIG. 1. The sensors are responsive to the position of the indicator sleeve 32, and therefore reflect the compression of the spring 30. A plurality of different spring displacements due to thermal expansion are sensed. The sensors control valves in the controller 42 which provide positive shut off of the servomechanism with the first displacement of the indicator sleeve 32 and corresponding compression of the spring 30 is sensed. When a second compression and displacement is sensed, greater than the first displacement, these valves in the controller 42 are operated so as to drive the motor in the open direction and retract the stem so as to relieve the spring forces. When the first displacement is again sensed the motor stops, and the prerequisite spring loading to maintain the valve seal remains. In the event that normal operation occurs, the position servomechanism is able to open and close the valve by the amount necessary to maintain the desired flow of material (e.g. catalyst) into the reaction chamber 10.

Figure 2:
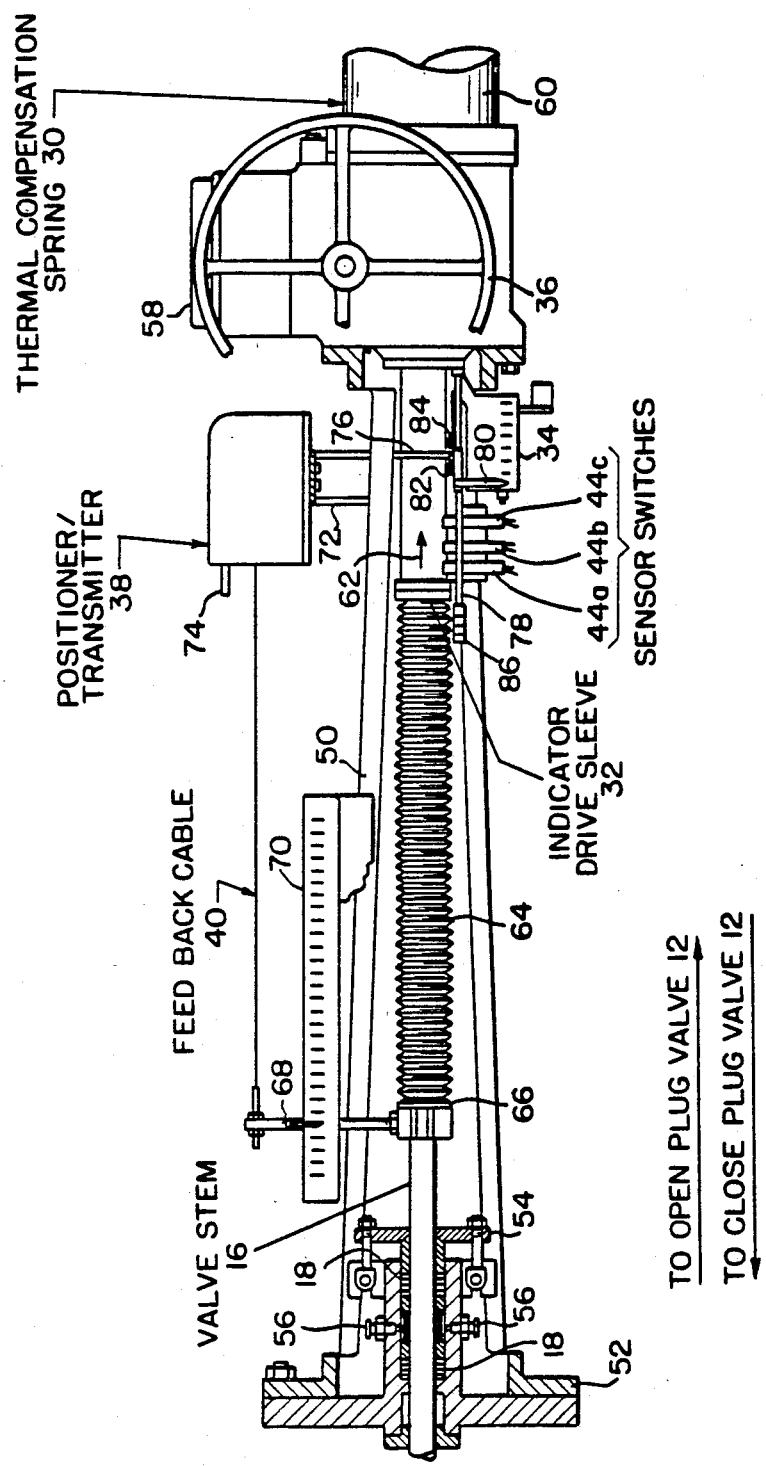
FIG. 2 is a front view, partially in section, of the valve operator showing connections to the thermal compression spring and the connection of the valve stem to the reaction chamber as well as the location of the sensor switches which detect the various positions indicative of the compression of the spring which are used in the control system provided by the invention.

Referring to FIG. 2 there is shown a yoke 50 attached at one end to a flange 52 which is connected to the reaction chamber 10 (FIG. 1). A retainer 54 holds packing 18 some of which may be injected through ports 56. The stem 16 extends through the packing 18 and the flange 52. The valve operator is contained in a housing 58 connected to the opposite end of the yoke 50. The thermal compression spring 30 is disposed in a cylindrical housing 60 which is attached to the operator housing 58. The handwheel 36 for cranking the worm gearing arrangement (26, FIG. 1) extends from the operator housing 58.

The indicator drive sleeve 32 extends out of the housing and moves in the direction of the arrow 62 upon compression of the compensation spring 30. The stem is moved in the directions indicated by the legends "to open plug valve 12" and "to close plug valve 12". A boot 64 protects the stem 16 and is connected at one end to a collar 66 which is attached to the stem. When the stem is retracted by the operator air motor, the boot 64 compresses much like a bellows.

A rod 68 is connected to the collar 66 and moves longitudinally with the stem 16. The position of the stem is indicated on a scale 70. The rod 68 is connected by way of the feedback cable 40 to the positioner and transmitter 38. The positioner and transmitter 38 is mounted in a housing attached by legs 72 to the yoke 50. Couplings (one of which 74 is visible in FIG. 2) provide the control signal air input and the air supply input to the positioner and transmitter 38. The air supply to the control room monitoring indicators also comes out of one of these couplings 74. A collar 76 which rotates with the indicator drive sleeve 32 translates, longitudinally, a slide 78. This slide is connected to the indicator pointer 80 of the flag and whistle assembly 34. This slide 78 has two ball bearings 82 and 84 connected thereto, which roll as the collar 76 on the indicator sleeve 32 translates.

Mounted on a leg of the yoke 50 are three sensor switches 44A, 44B and 44C which provide the sensor assembly 44 (FIG. 1). These switches are preferably magnetic latch switches which detect and latch when a body 86 of magnetic material (suitably soft iron) at the end of the indicator slide 78 is disposed thereover. Suitable switches of this sort are sold by the General Equipment and Manufacturing Company of 3300 Fern Valley Road, Louisville, Ky., their Model 70 Series GO switches. The switch 44A is suitably positioned with respect to the body of magnetic materials 86 on the slide 78 so that the switch 44A is activated corresponding to a first displacement of the indicator drive sleeve 32 in the direction of the arrow 62 and a corresponding compression of the thermal compensation spring. For a typical plug valve and stem arrangement which may be approximately 15 feet long using a LIMITORQUE operator and compression spring, this first switch 44A may be positioned to be actuated so as to sense a 1¼ inch compression of the spring. The next switch 44B may be closely adjacent to the first switch, and offset if desired so as to fit in the available space, for sensing when the spring 30 compresses 1½ inches. The final switch 44C is suitably positioned to sense a compression of approximately 2 inches which is indicative of an over compression condition and the onset of the failure mode.

The system is operative so as to maintain a 1¼ inch displacement and corresponding bias on the plug valve after the plug valve 12 is closed. Upon detection of a 1¼ inch compression of the spring by the first sensor switch 44A, the operator shuts down and the air motor does not drive the stem. A further compression to 1½ inches, as will be caused by thermal growth and expansion of the plug valve and its stem and seat, is detected by the second sensor switch 44B. Then the air motor is reversed and the stem is retracted until the compression of the spring is reduced to 1¼ inches. So long as the valve remains seated, a bias from the spring corresponding to a 1¼ inch compression will be maintained so as to maintain the valve sealed. In the event that overcompression occurs in spite of the effort to contract the stem, the last switch 44C is actuated at a compression of 2 inches. This sounds an alarm so as to warn personnel of a failure mode condition.

Figure 3:
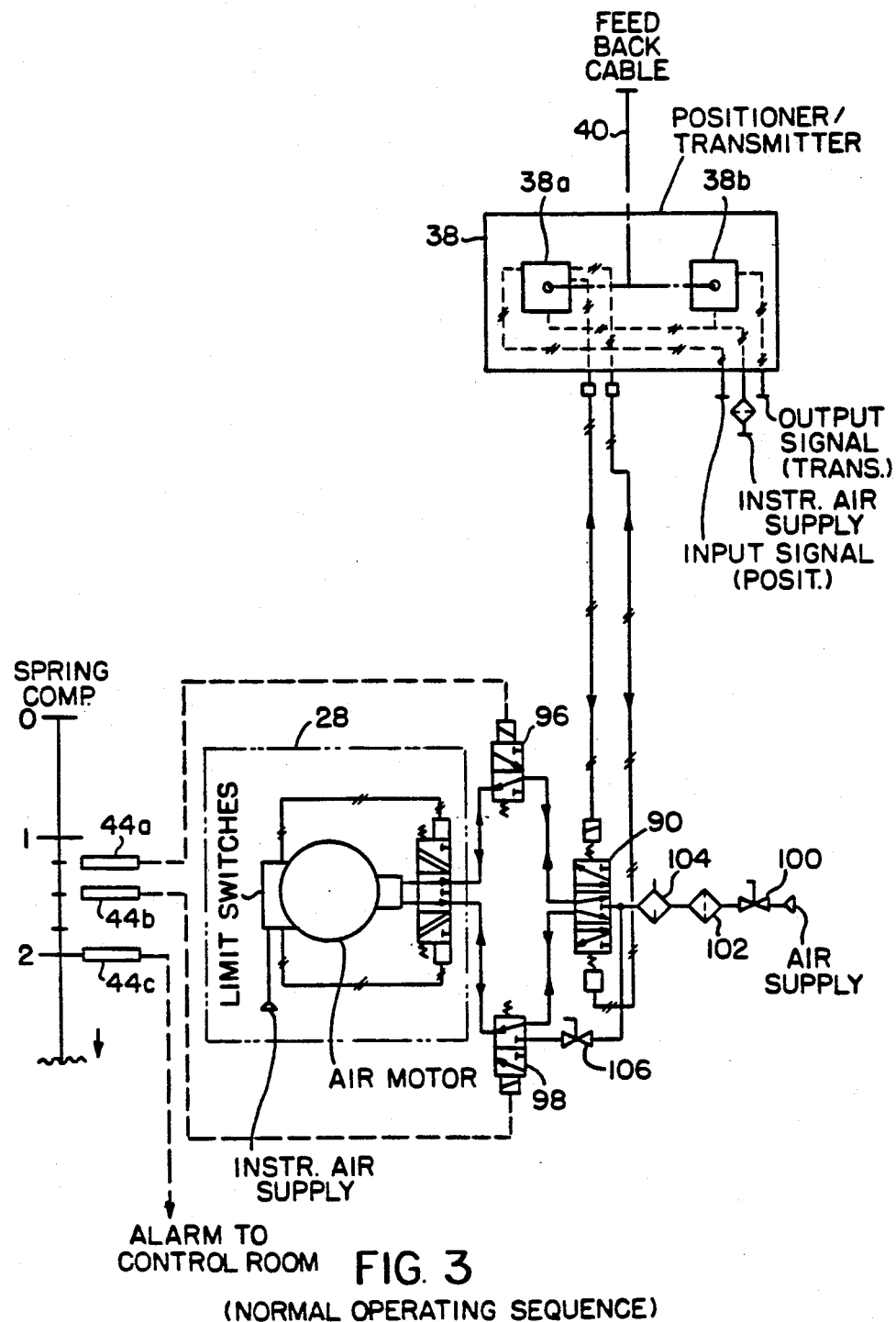
FIGS. 3, 4 and 5 are schematic diagrams of the valve operator control system which embodies the invention in different positions during its operating sequence.
Figure 4:
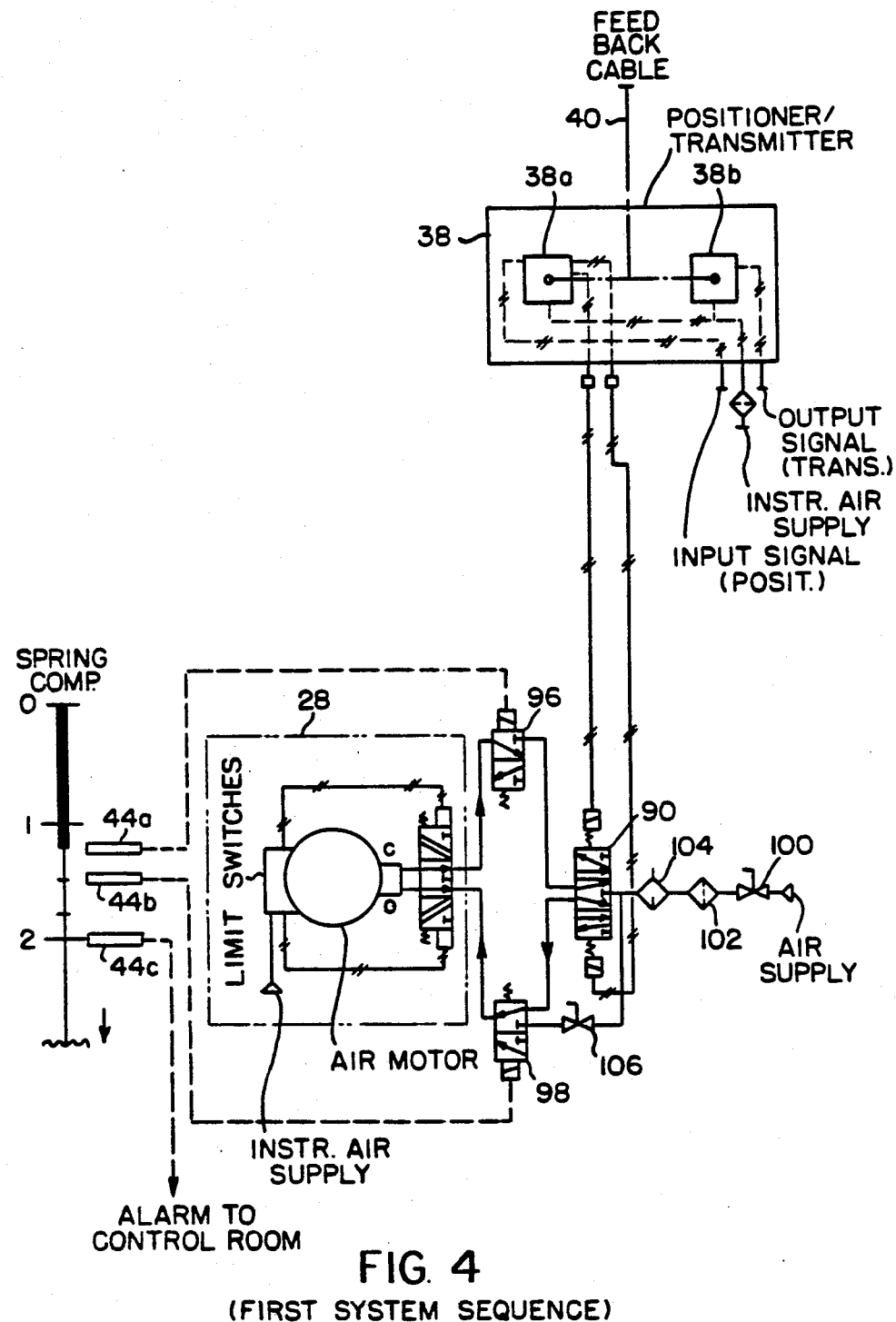
Figure 5:
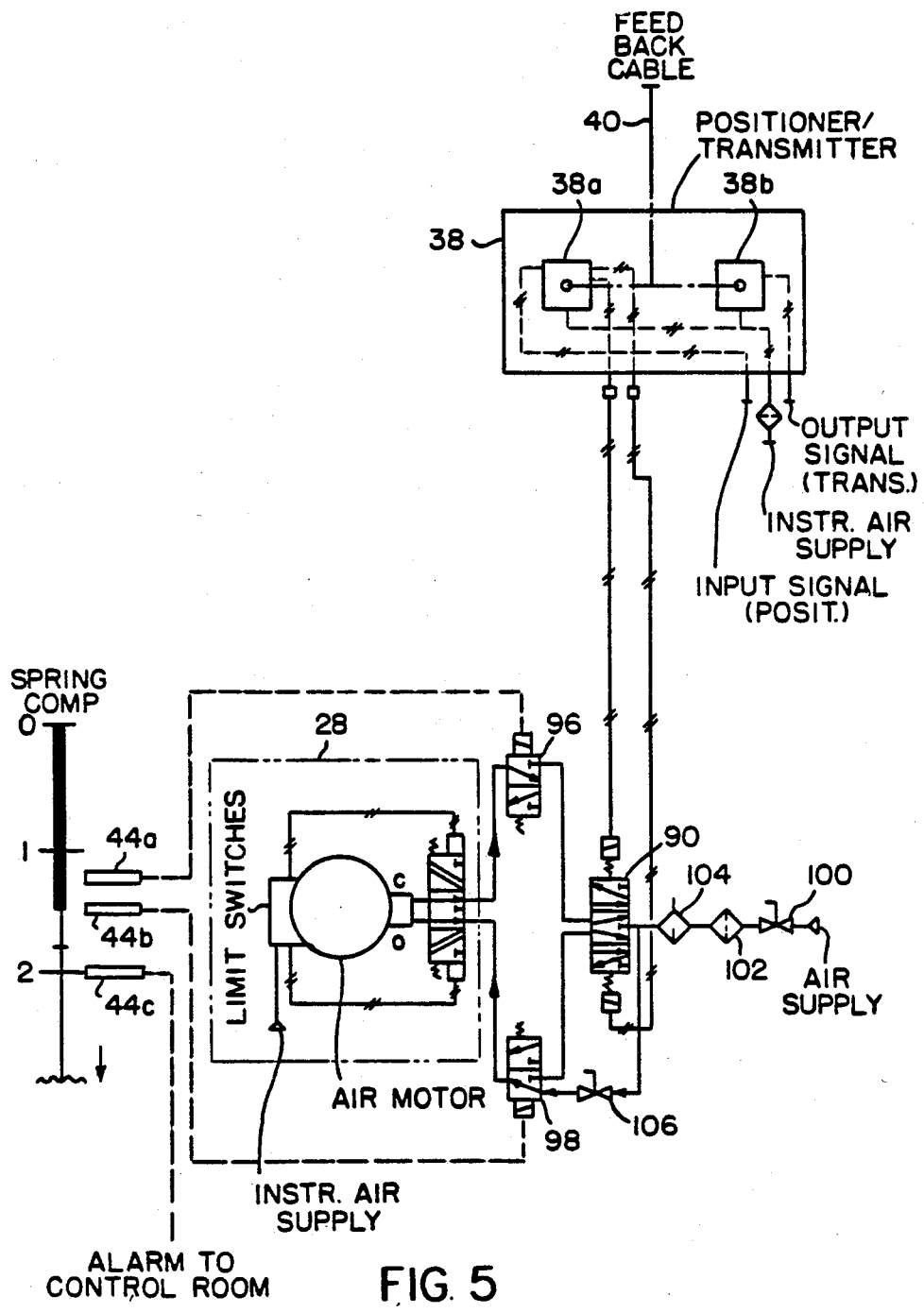

The control system and its operation will become more apparent from FIGS. 3, 4 and 5. FIG. 3 shows the system in normal operating sequence when the plug valve is not seated (valve closed condition) and the servomechanism is operative to vary the valve opening, thereby controlling the flow of material into the reaction chamber. FIG. 4 shows another position in the sequence of operation of the control system after the valve has seated and the compression spring has compressed and the indicator drive sleeve 32 has undergone a first displacement, which in the example discussed above for purposes of illustration is a displacement of 1¼ inches. FIG. 5 shows the next step in the sequence of operation when a displacement of 1½ inches or more has occurred. The control system is preferably embodied in an existing and conventional operator which has a pneumatic servomechanism. The invention may also be embodied in other control systems which rely on hydraulics or electrical and electronic switching, as will become apparent as the description proceeds.

Considering FIG. 3, it will be noted that mechanical connections are indicated, as is the case with the feedback cable by lines made up of long and short dashes. Electrical connections are indicated by lines made up of short dashes. Air lines are solid lines which are crossed by double strokes in the case of instrument air lines which carry regulated instrument air, as from a compressor. Also used and indicated by solid lines are lines which carry compressed air supply which may vary, for example from 60 to 100 PSI. The position servomechanism responds to an input pneumatic position signal from the process controller. Depending upon the position of the feedback cable, air will be supplied from the differential detector valve 38A of the positioner transmitter 38 to the control chambers of a pneumatically controlled four way control valve 90. This valve is shown in the center or cut off position in the drawing, but moves up and down when the valve is to be actuated in the valve opening and valve closing directions, respectively.

The motor 28 is equipped with limit switches 92 which are supplied with instrument air and actuate a pneumatically controlled three way valve 94. When certain travel limits are reached as measured by a certain number of rotations of the motor in the closing direction and a certain number of rotations of the motor in the opening direction, the three way valve 94 is actuated so as to permit air flow through the motor to cause it to operate in the opposite direction; i.e., to close the valve after the motor has reached its limit in the opening direction and to open the valve after the motor has reached its limit in the closing direction. The limit switches 92 and the valve 94 do not provide positive shutoff of the motor nor positive control of the retraction of the valve. The limit switches 92 and the valve 94 are also subject to variation in the instrument air supply pressure.

The sensor switches 44A, 44B and 44C are electrically connected by way of electric circuits completed through the switches which carry operating current, in the case of switches 44A and 44B to electro/pneumatic two way valves 96 and 98 respectively. The switch 44C which detects the 2 inch overcompression displacement completes a circuit to an electrically operated alarm in the control room where the process is being monitored.

Air for operating the motor passes through a shutoff valve 100, an air filter 102 and an air lubricator 104 to the control valve. When the electro/pneumatic two way valves 96 and 98 are not actuated, the supply air passes directly through these valves, without interference, to the motor 28. Depending upon the operation of the position servomechanism, the control valve 90 moves up or down, thereby causing the motor to operate the valve in either its closed or open direction.

A bypass path for supply air is provided by way of a shutoff valve 106 to the electro/pneumatic control valve 98. The supply air is cut off at the valve 98 during normal operation. Also during normal operation, the transmitter valve 38B in the positioner transmitter provides an output air signal which may be communicated to the control room, to indicate the position of the plug valve 12 (FIG. 1), remotely.

When the sensor switch 44A detects a compression of the spring 30 to 1¼ inches (the plug valve 12 then having already reached the seat 14), an electrical signal operates the two way valve 96. Then, even if the control valve 90 were actuated to its valve closing position, the two way valve 96 cuts off flow to the motor 28. The plug valve 12 can then only be opened under control of the position servomechanism. It cannot be closed any further. Further compression of the spring to the position where the second sensor switch 42B is located (a 1½ inch compression) causes the other two way valve 98 to be actuated. A positive bypass path for supply air to the motor then extends through the two way valve 98 to the open port of the motor 28. The motor is then operated and causes retraction of the stem 16 and the plug valve 12 until approximately 1¼ inch compression remains. Then, a predetermined bias which tends to maintain the plug valve sealed against the seat is maintained. Of course, if the valve is opened under control of the position servomechanism in response to an input signal to the positioner transmitter 38, the two way valves 96 and 98 will both return to their initial position as shown in FIG. 3. Normal operation can then recommence under the complete control of the positioner transmitter 38. If the onset of a failure mode occurs, the more distant sensor switch 44C is actuated and the alarm sounds. It will be seen, therefore, that positive cutoff and automatic maintenance of bias or load on the plug valve 12 is accomplished with minimum redesign of the operator for the plug valve. The benefits of the operator are maintained while its disadvantages are eliminated.

From the foregoing description it will be apparent that there has been provided an improved valve operator control system. Variations and modifications of the herein described system, within the scope of the invention, will undoubtedly suggest themselves to those skilled in the art. Accordingly the foregoing description should be taken as illustrative and not in a limiting sense.

We claim:

1. In a control system for a valve having a valve actuator, an absolute position responsive servomechanism operating said valve actuator for motivating the movable member of said valve toward and away from the seat of said valve which is subject to thermal displacement, and a compression spring coupled to said valve member and biasing said valve member against said seat upon engagement of said valve member with said seat, the improvement comprising sensor means for detecting the displacement in compression of said spring to a plurality of positions, a first of which positions corresponds to a predetermined spring load of said valve member against said seat and a second of which positions corresponds to an overcompression of said spring, and means operative independently of said position responsive servomechanism for inhibiting the motivation of said valve by said servomechanism when a displacement of said spring to said first position is detected by said sensor means and for operating said servomechanism to displace said valve member away from said second position back towards said first position when a displacement of said valve member to said second position is detected by said sensor means whereby to maintain the compression of said spring and the bias of said valve member against said seat in a preset range when said servomechanism brings said valve to its closed position, in spite of thermal displacement of said seat to prevent any overcompression of said spring.

2. The invention as set forth in claim 1 wherein said valve is a plug valve, the valve member thereof being a plug mounted on a stem, said stem and seat being disposed in a chamber operative over a wide range of temperature, said actuator being a motor coupled to a stem for driving it under control of said servomechanism toward and away from said seat, said servomechanism also including a controller for said motor and a differential detector responsive to a position control signal and a feedback signal indicative of the displacement of said stem, said differential detector being connected in operating relationship with said controller, said detecting means being a plurality of proximity switches actuable when said spring is displaced to each of said plurality of positions, and said independently operative means of being connected between said controller and said motor.

3. The invention according to claim 1 wherein said servomechanism includes a motor in driving relationship with said valve member, a motor controller and a differential detector responsive to a control signal and to a feedback signal corresponding to the displacement of said valve member from a certain position, said independently operative means being connected between said controller and said motor.

4. The invention according to claim 3 wherein said spring is housed in a container, a stationery housing in which said motor is fixed, said valve member having a stem, a drive coupling said motor and stem for movement of said stem longitudinally thereof toward and away from said seat, said coupling including a sleeve connected to said spring and displaceable in said longitudinal direction therewith, said detecting means being responsive to longitudinal displacement of said sleeve to third and fourth positions corresponding to compression displacements of said spring to said first and second positions.

5. The invention as set forth in claim 3 wherein said motor is an air motor, said controller is a valve connecting said motor to a source of pressurized air in flow controlling and flow direction switching relationship, and said independently operative means comprising separate two-way valves for controlling the flow of air from said controller valve through said motor and providing an independent flow path for said pressurized air through said motor, one of said two-way valves being operated by said first position detecting means and the other by said second position detecting means.

6. The invention according to claim 5 wherein said position detecting means are electrical switches, said two-way valves are electro/pneumatic valves, and circuit means connecting said two-way valves in controlled relationship with said detecting means, said controller valve being a pneumatically controlled valve having control cavities, said servomechanism being a pneumatic servo with a balance position detector having output air flow paths to said control cavities.

* * * * *